United States Patent
Lidey

(10) Patent No.: US 9,682,807 B1
(45) Date of Patent: Jun. 20, 2017

(54) MULTI-SURFACE CABLE TYING APPARATUS

(71) Applicant: Sean M. Lidey, Anchorage, AK (US)

(72) Inventor: Sean M. Lidey, Anchorage, AK (US)

( * ) Notice: Subject to any disclaimer, the term of this patent is extended or adjusted under 35 U.S.C. 154(b) by 0 days.

(21) Appl. No.: 15/366,086

(22) Filed: Dec. 1, 2016

Related U.S. Application Data

(63) Continuation-in-part of application No. 15/277,416, filed on Sep. 27, 2016.

(51) Int. Cl.
*B65D 63/00* (2006.01)
*B65D 63/10* (2006.01)
*F16L 37/02* (2006.01)
*F16B 7/04* (2006.01)

(52) U.S. Cl.
CPC ............ *B65D 63/1027* (2013.01); *F16B 7/04* (2013.01); *F16L 37/02* (2013.01); *B65D 2563/103* (2013.01)

(58) Field of Classification Search
CPC .. B65D 63/1027; B65D 63/10; B65D 63/103; Y10T 24/1498; Y10T 24/141
See application file for complete search history.

(56) References Cited

U.S. PATENT DOCUMENTS

| | | | | |
|---|---|---|---|---|
| 3,246,439 A | * | 4/1966 | Foster, Jr. ................. | E04B 9/20 248/205.3 |
| 4,045,843 A | * | 9/1977 | Loose ................ | B65D 63/1018 24/16 PB |
| 4,263,697 A | * | 4/1981 | Speedie ............. | B65D 63/1081 24/16 PB |
| 5,146,654 A | * | 9/1992 | Caveney ............. | B29C 45/0053 24/16 PB |
| 5,470,520 A | * | 11/1995 | Sorensen ............ | B29C 45/4407 264/297.2 |
| 5,664,294 A | * | 9/1997 | Sorensen ........... | B65D 63/1072 24/16 PB |
| 5,687,455 A | * | 11/1997 | Alexander ......... | B65D 63/1072 24/16 PB |
| 5,884,367 A | * | 3/1999 | Teagno ................. | F16L 3/2332 24/16 PB |
| 5,911,368 A | * | 6/1999 | Davignon .......... | B65D 63/1081 24/16 PB |
| 6,185,792 B1 | * | 2/2001 | Nelson ............... | B65D 63/1072 24/16 PB |

(Continued)

*Primary Examiner* — Robert J Sandy
*Assistant Examiner* — Matthew Sullivan
(74) *Attorney, Agent, or Firm* — Dale J. Ream

(57) ABSTRACT

A multi-surface cable tie apparatus includes a first cable tie device coupled to a spaced apart second cable tie device via a bridge member, each cable tie device having a head member having opposed inner and outer ends, the head member defining an aperture and a channel defining a generally V-shaped configuration in communication with the aperture. Each cable tie device includes a tying strap that includes a planar base strip having that includes a proximal end adjacent the inner end of the head member and a distal end opposite the proximal end, the base strip having an elongate toothed portion mounted to an inside surface. The toothed portion includes a generally triangular cross-section with a plurality of teeth extending away from the base strip. The aperture is configured to selectively receive the base strip and the channel is configured to receive the toothed portion of the tying strap.

20 Claims, 19 Drawing Sheets

(56) References Cited

U.S. PATENT DOCUMENTS

| | | | |
|---|---|---|---|
| 7,254,872 B2* | 8/2007 | Ross | A44B 11/001 24/163 K |
| 7,520,030 B2* | 4/2009 | Laporte | B65D 63/1063 24/16 PB |
| 8,069,537 B2* | 12/2011 | Gallant | B65D 63/1018 24/16 PB |
| 8,281,461 B2* | 10/2012 | Geiger | B65D 63/14 24/16 PB |
| 8,375,523 B2* | 2/2013 | Pilon | B65D 63/1081 24/16 PB |
| 8,920,095 B2* | 12/2014 | Baugh, Sr. | F16B 19/00 411/512 |
| 9,021,665 B2* | 5/2015 | Chen | B65D 63/1081 24/16 PB |
| 9,038,246 B2* | 5/2015 | Liang | B65D 63/1072 24/16 PB |
| 9,151,411 B2* | 10/2015 | Owen | B65D 63/1027 |
| 9,237,775 B2* | 1/2016 | Barfoot | A41F 1/008 |
| 2006/0096066 A1* | 5/2006 | Wambaugh | B65D 63/1063 24/16 PB |
| 2012/0174355 A1* | 7/2012 | Fraze | A41F 1/008 24/68 A |

* cited by examiner

MULTI-SURFACE CABLE TYING APPARATUS

REFERENCE TO RELATED APPLICATIONS

This application claims the benefit of non-provisional patent application Ser. No. 15/277,416 filed Sep. 27, 2016 titled Multi-Surface Cable Tying Device, which is incorporated herein by reference.

BACKGROUND OF THE INVENTION

This invention relates generally to cable tie devices and, more particularly, to a cable tying apparatus having multiple ratcheting teeth surfaces arranged in a generally triangular configuration to enhance the locking strength and minimize failure of the cable tying device.

Cable ties have been used for a long time for bundling and securing wires, cables, hoses, and other articles together so as to inhibit the lateral or rotational movement of the items. Cable ties generally provide a ratcheting system in which a flexible strap having teeth is inserted through a head or button member in a one-way only procedure. Like a winch, the cable tie fastener may be tightened by pulling the strap tighter. The typical cable tie includes a single row of teeth in a square or rectangular arrangement such that, even when tightened, are subject to failure if enough force or vibration is applied.

Although presumably effective for most applications, several recent airplane crashes have been attributed to fuel injector lines and other hoses or wires becoming detached from critical engine components. Preventing these accidents requires a more fail-safe cable tying device having more than one surface of teeth and a geometrical configuration that will withstand substantial pulling or vibratory forces. In fact, a pairing of two adjacent and connected cable tying devices works together to resist failure even more successfully.

Therefore, it would be desirable to have a cable tying device having multiple and angled surfaces with ratchet teeth that enhances the grip strength when engaged. Further, it would be desirable to have a cable tying device in which a tying strap includes a toothed portion having a triangular configuration and in which a head member defines a triangular channel having ratchet teeth capable of receiving the toothed portion in a more secure ratchet engagement. In addition, it is even more desirable to have a pair of cable tying device coupled in a laterally spaced apart configuration to increase the efficacy of performance and minimize the risk of failure.

SUMMARY OF THE INVENTION

A cable tie device according to the present invention includes a head member having an outer end and an opposed inner end, the head member defining an aperture having rectangular configuration and a channel defining a generally V-shaped configuration in communication with the aperture. The cable tie device includes an elongate tying strap that includes a base strip having a planar configuration that includes a proximal end adjacent the inner end of the head member and a distal end opposite the proximal end, the base strip having an elongate toothed portion mounted to an inside surface of the base strip. The toothed portion includes a generally triangular cross-section and having a plurality of teeth extending away from the base strip. The aperture is configured to selectively receive the base strip and the channel is configured to receive the toothed portion of the tying strap.

In addition, a multi-surface cable tie apparatus may include a pair of cable tie devices that are laterally spaced apart and parallel and connected by a bridge member. In this embodiment, cables or other components may be more securely bundled by the spaced apart yet connected pair of cable tie devices.

Therefore, a general object of this invention is to provide a multi-surface cable tie device for more securely bundling cables, wires, hoses, or other work pieces together even when subjected to abnormal or excessive forces or vibrations.

Another object of this invention is to provide a multi-surface cable tie device, as aforesaid, which includes a triangular toothed portion having a pair of inwardly angled walls and a corresponding head member having angled surfaces with ratchet teeth configured to receive the teeth of the toothed portion in a ratchet engagement.

Still another object of this invention is to provide a multi-surface cable tie device, as aforesaid, which is easy to use and cost-effective to manufacture.

A further object of this invention is to provide a multi-surface cable tie apparatus, as aforesaid, that includes a pair of laterally spaced apart cable tie devices connected by a bridge member that increases grip and decreases the risk of failure to secure objects against unintended movements.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4a is a rear perspective view of the cable tie device as in FIG. 1a removed from the work piece;

FIG. 4b is a front perspective view of the cable tie device as in FIG. 4a;

FIG. 7b is an isolated view on an enlarged scale taken from FIG. 7a;

FIG. 10 is an isolated view of a head member as in FIG. 9a;

FIG. 11b is an isolated view on an enlarged scale taken from FIG. 11a;

FIG. 12a is a side view of the cable tie device as in FIG. 3;

FIG. 12b is a sectional view taken along line 12b-12b of FIG. 12a;

FIG. 13a is a side view of the cable tie device as in FIG. 8;

FIG. 13b is a sectional view taken along line 13b-13b of FIG. 13a;

DESCRIPTION OF THE PREFERRED EMBODIMENT

Figures 1A, 1B:
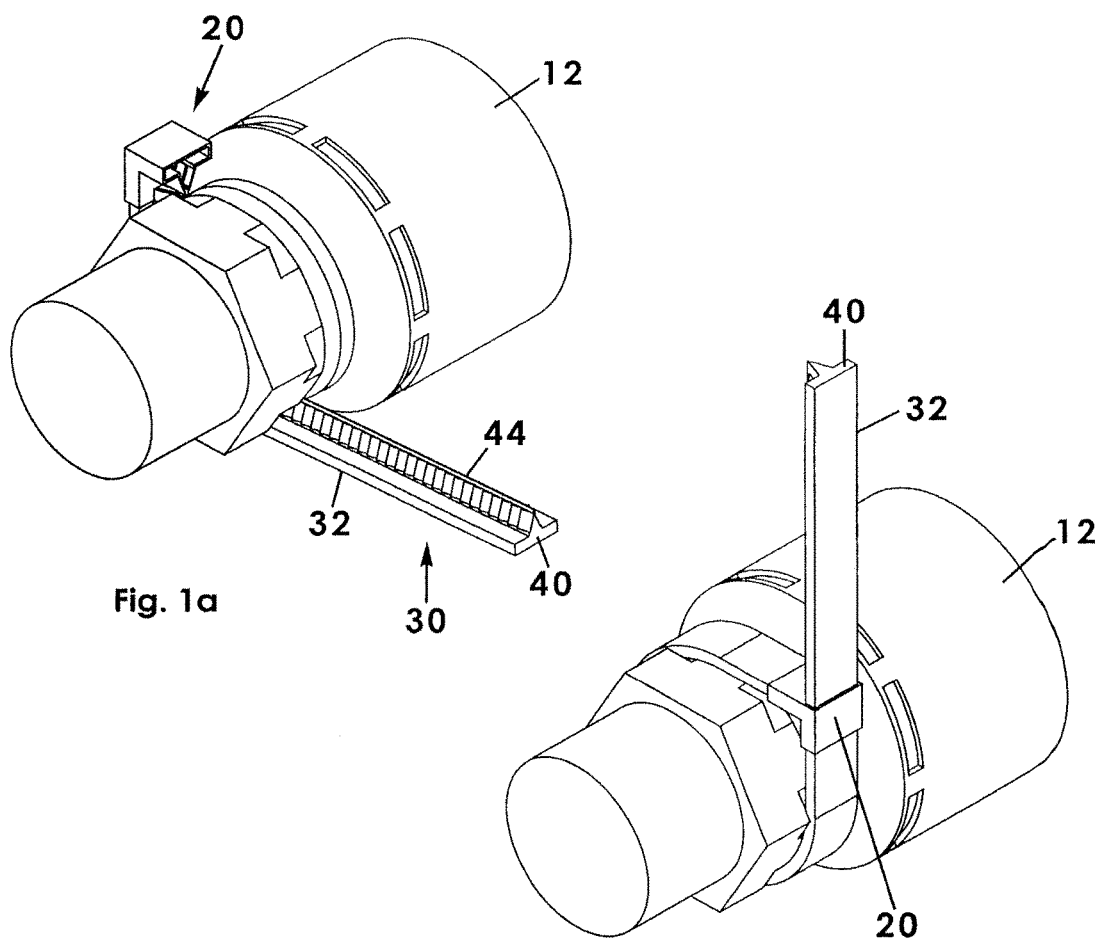
FIG. 1a is a perspective view of a multi-surface cable tie device according to a preferred embodiment of the present invention illustrated in an unengaged configuration.
FIG. 1b is a perspective view of the cable tie device as in FIG. 1a illustrated in an engaged configuration.

A cable tying device according to a preferred embodiment of the present invention will now be described with reference to FIGS. 1a to 17 of the accompanying drawings. The cable tying device 10 includes a head member 20 and a tying strap 30 configured to secure a work piece 12 to another or even components of the same work piece.

With reference to FIGS. 1a, 1b, and 3 to 7b, the head member 20 of the cable tying device 10 includes an outer end 22 and an opposed inner end 24 and defines an aperture 26 adjacent the outer end 22 having a generally rectangular configuration. The aperture 26 may extend completely between top 25 and bottom 27 walls of the head member 20. The head member 20 further defines a channel 28 having a generally V-shaped configuration in operative communication with the rectangular aperture 26. The channel 28 may be referred to as having a triangular configuration or as being a notch. The head member 20 may have an L-shaped configuration defining an inlet 21 at a lower end and an outlet 23 at an upper end—both, however, being adjacent the outer end 22 of the head member 20. It is understood that the inlet and outlet are descriptive of where the tying strap 30 enters and exits the aperture 26 and channel 28, as will be further described below.

The tying strap 30 includes a base strip 32 having a generally flat or planar configuration and having a smooth outside surface 36. A proximal end 38 of the base strip 32 is coupled to the inner end 24 of the head member and a distal end 40 of the base strip 32 is displaced from and opposite the proximal end 38. In one embodiment, the distal end 40 may have a truncated configuration although a pointed tip configuration would also work. The tying strap 30 includes parallel side edges 42 extending between the proximal end 38 and distal end 40 so as to define a width of the base strip 32. The tying strap 30 may be constructed of a flexible plastic material so that it may be formed into a loop for insertion into and through the head member 20 as described below.

The tying strap 30 also includes a toothed portion 44 extending longitudinally between the proximal end 38 and distal end 40 of an inside surface 34 of the base strip 32, the toothed portion 44 preferably being positioned about midway between the side edges 42 and having a narrow width profile. The base strip 32 is wider than the toothed portion 44 such that the base strip 32 extends laterally and outwardly on both sides of the toothed portion 44. In a preferred embodiment, the toothed portion 44 has a generally V-shaped or triangular configuration having a plurality of teeth 50 extending away from the base strip 32.

It is understood that the base strip 32 and aperture 26 have generally rectangular configurations and substantially similar dimensions. In like manner, the toothed portion 44 of the tying strap 30 and the channel 28 have generally V-shaped or triangular configurations and substantially similar dimensions. In other words, the head member openings and the tying strap 30 are "complementary" structures such that the head member 20 may selectively receive the tying strap 30 therethrough when inserted distal end 40 first (FIG. 1b).

Figure 3:
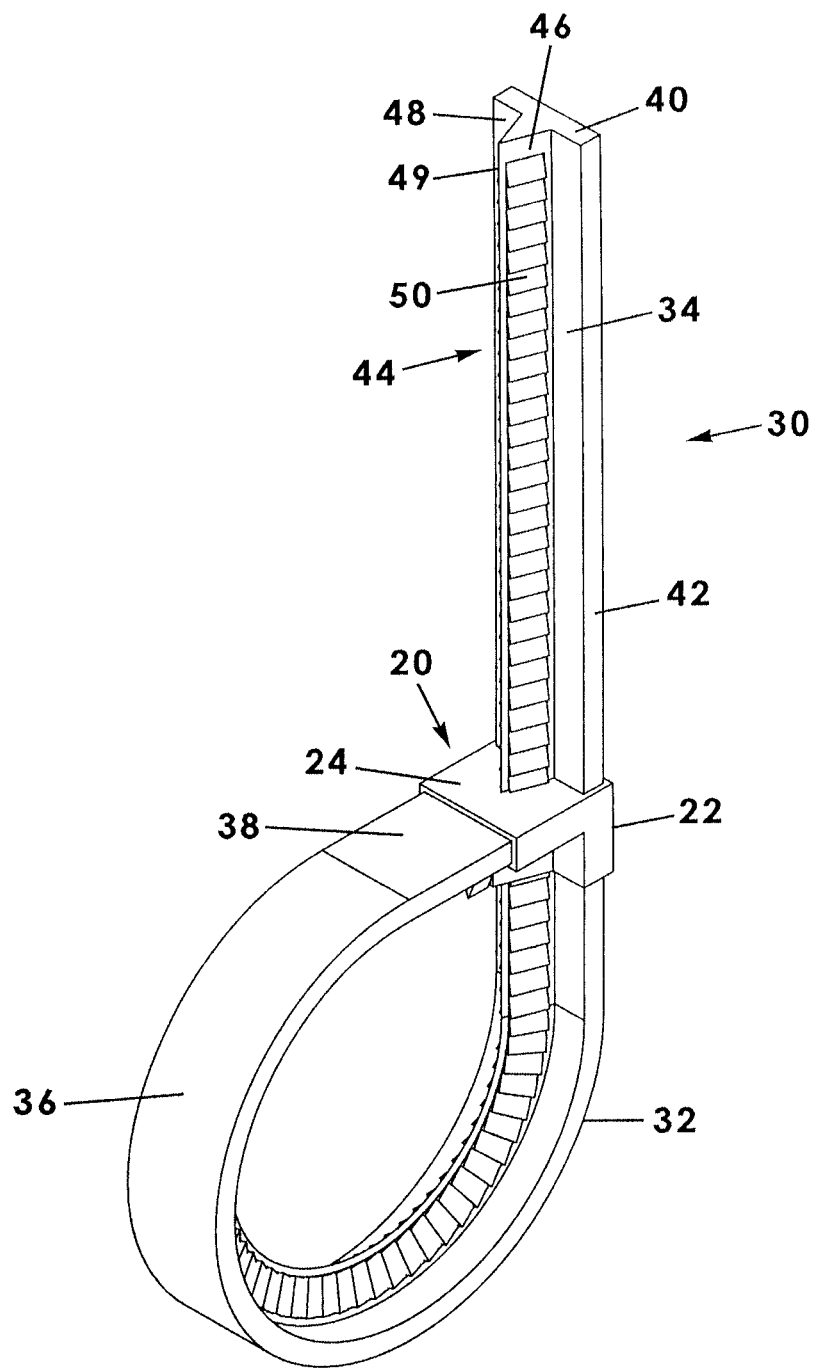
FIG. 3 is a perspective view of the cable tie device as in FIG. 1b removed from a work piece.
Figure 4:
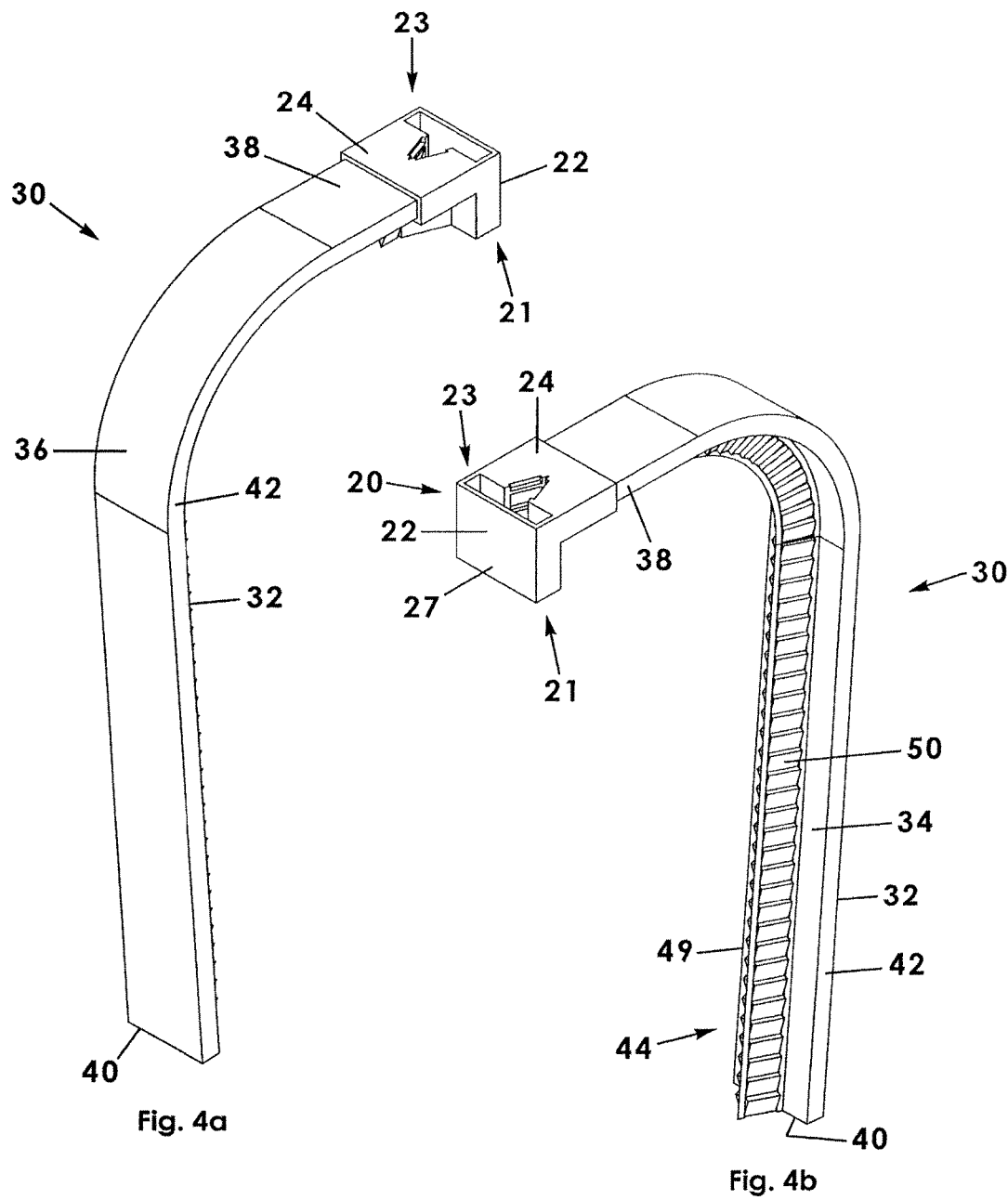

Now, more particularly, the toothed portion 44 includes a first side wall 46 that is inclined or angled inwardly relative to the base strip 32 and a second side wall 48 that is angled inwardly toward the first side wall 46 (FIG. 3). Together, the side walls are joined at an apex 49 displaced from the base strip 32. Stated another way, each side wall includes a lower end adjacent the inside surface of the base strip 32 and spaced apart from one another. The apex 49 is opposite respective lower ends. The toothed portion 44 includes a generally triangular shaped cross-section.

Figure 5:
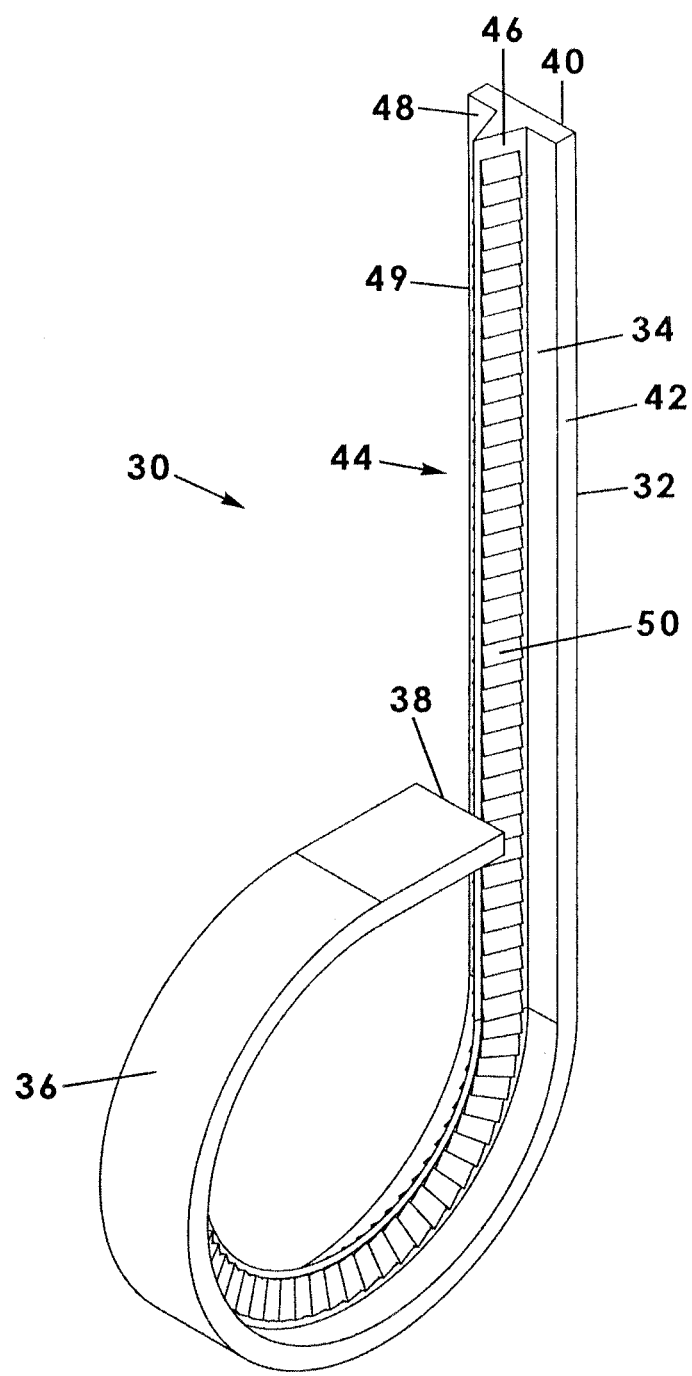
FIG. 5 is an isolated perspective view of a tying strap according to the present invention.
Figure 6:
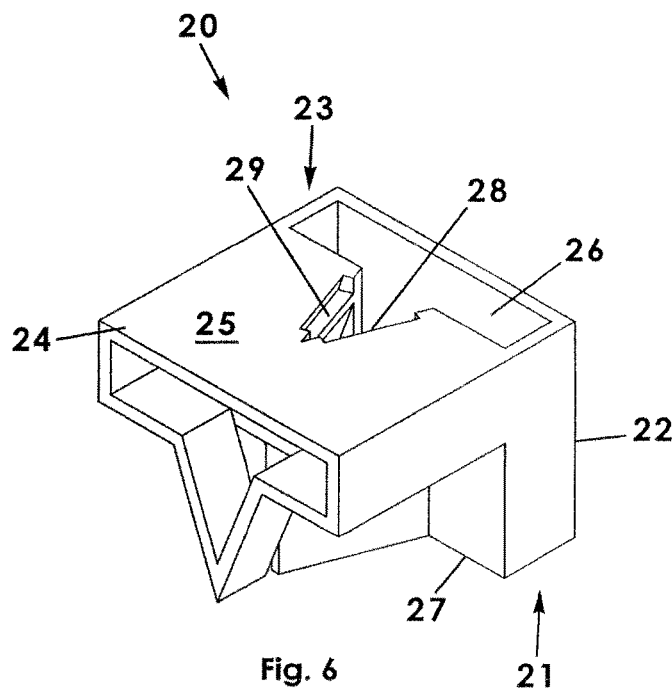
FIG. 6 is an isolated perspective view of a head member according to the present invention.
Figure 7A:
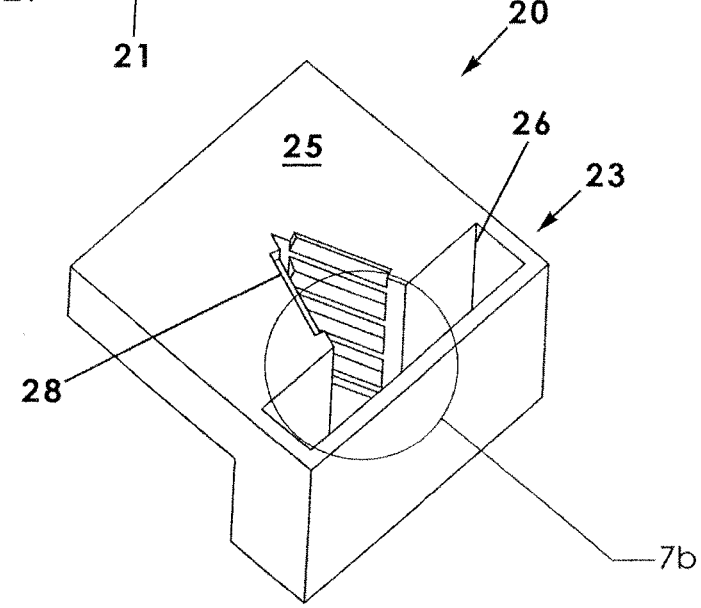
FIG. 7a is an isolated perspective view from another angle of the head member as in FIG. 6.
Figure 7B:
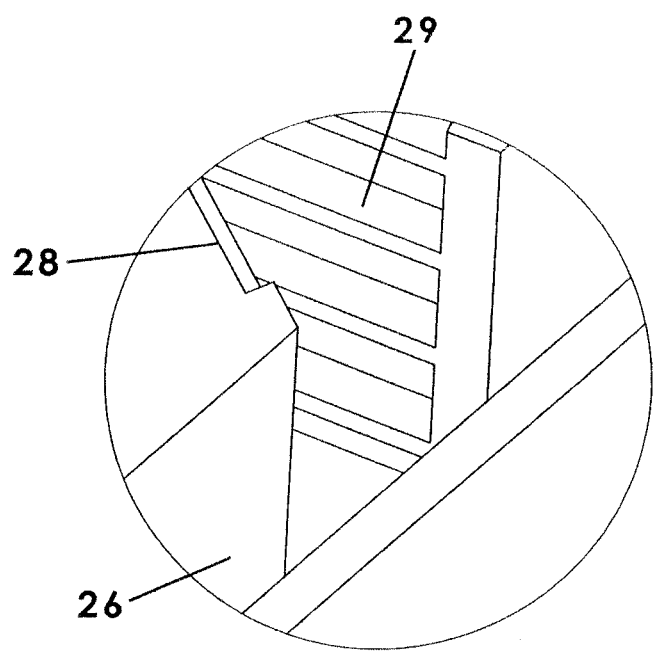
Figure 8:
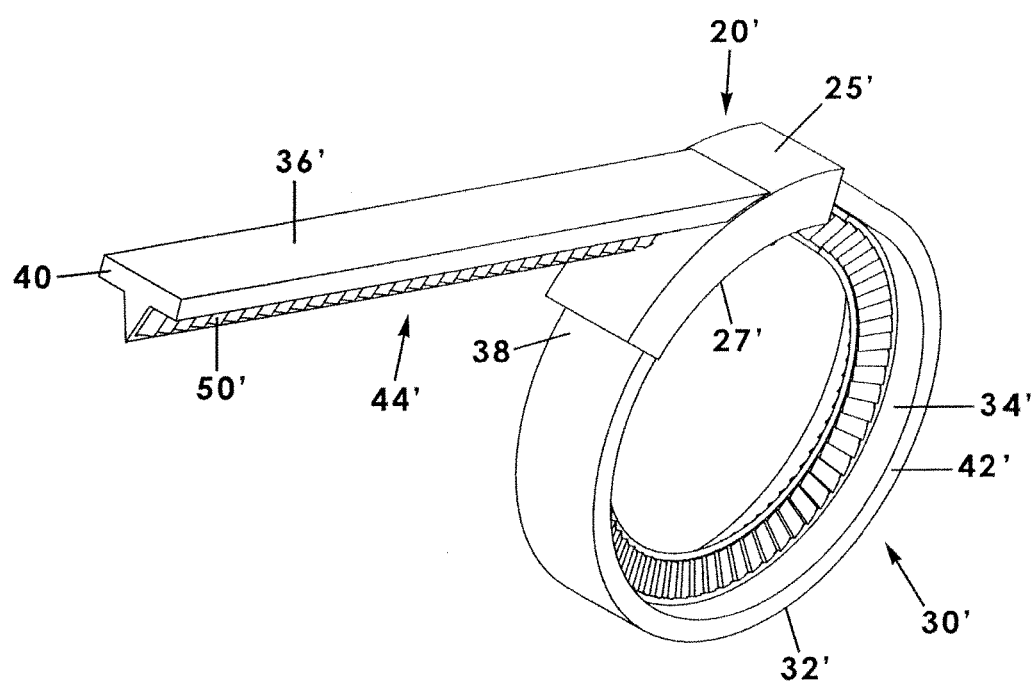
FIG. 8 is a perspective view of the cable tie device as in FIG. 2.
Figures 9A, 9B:
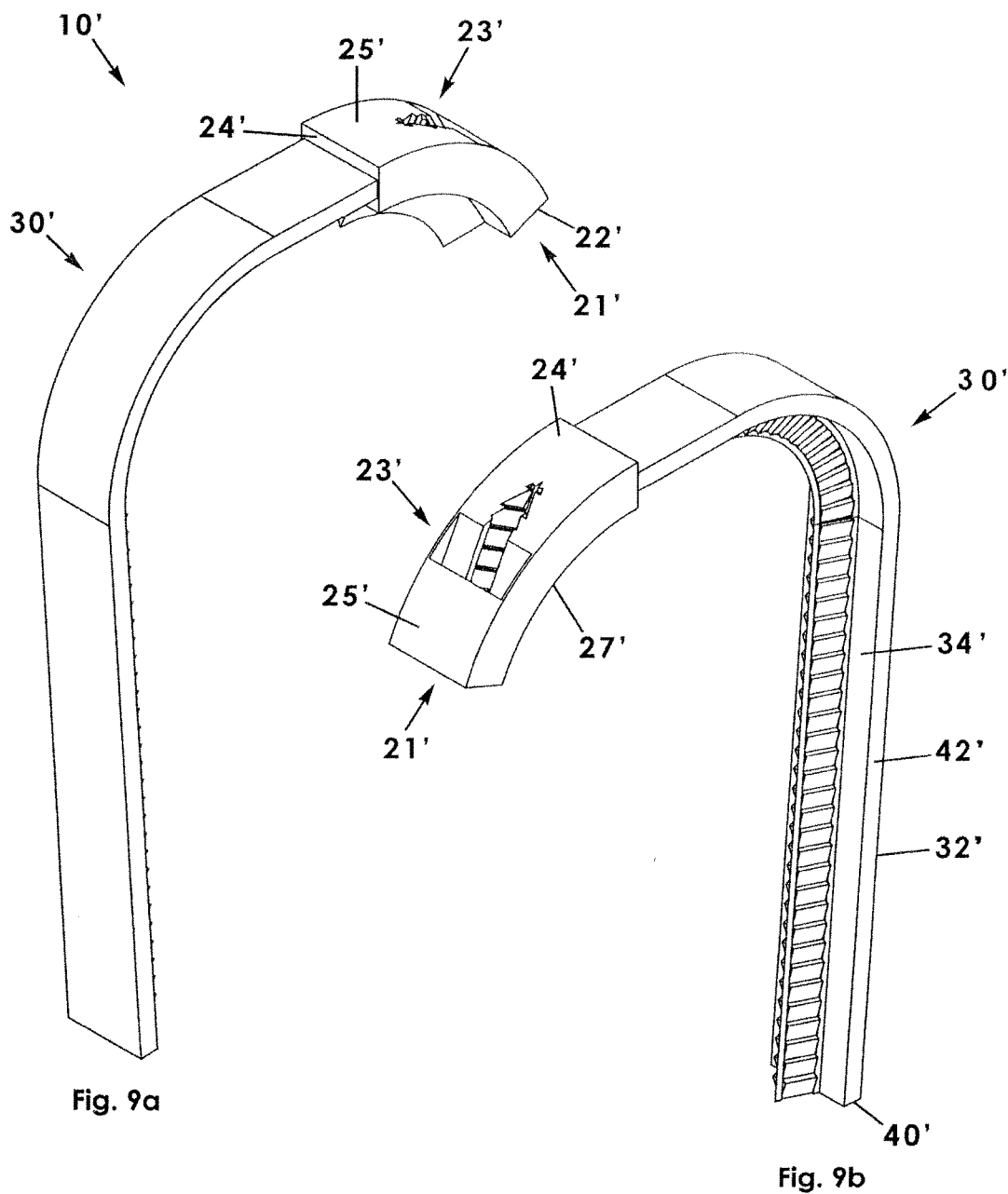
FIG. 9a is a rear perspective view of the cable tie device as in FIG. 8.
FIG. 9b is a front perspective view of the cable tie device as in FIG. 8.
Figure 10:
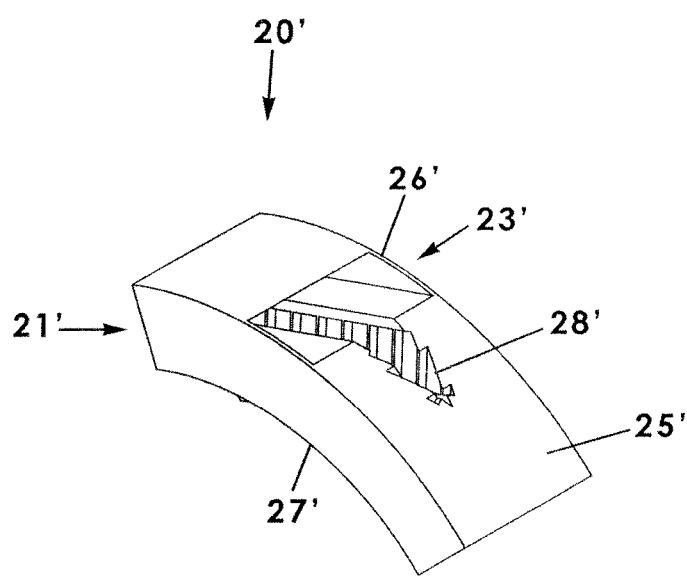
Figure 11A:
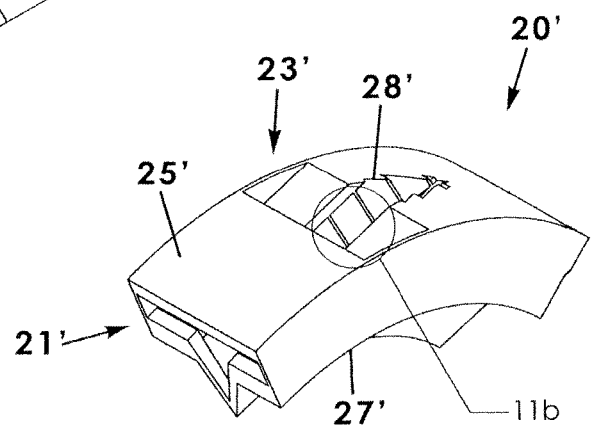
FIG. 11a is an isolated view from another angle of the head member as in FIG. 10.
Figure 11B:
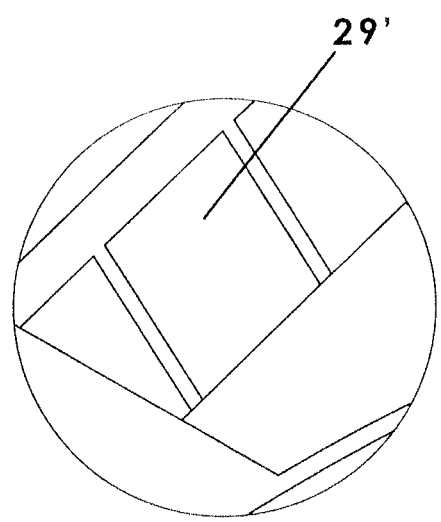
Figures 12A, 12B:
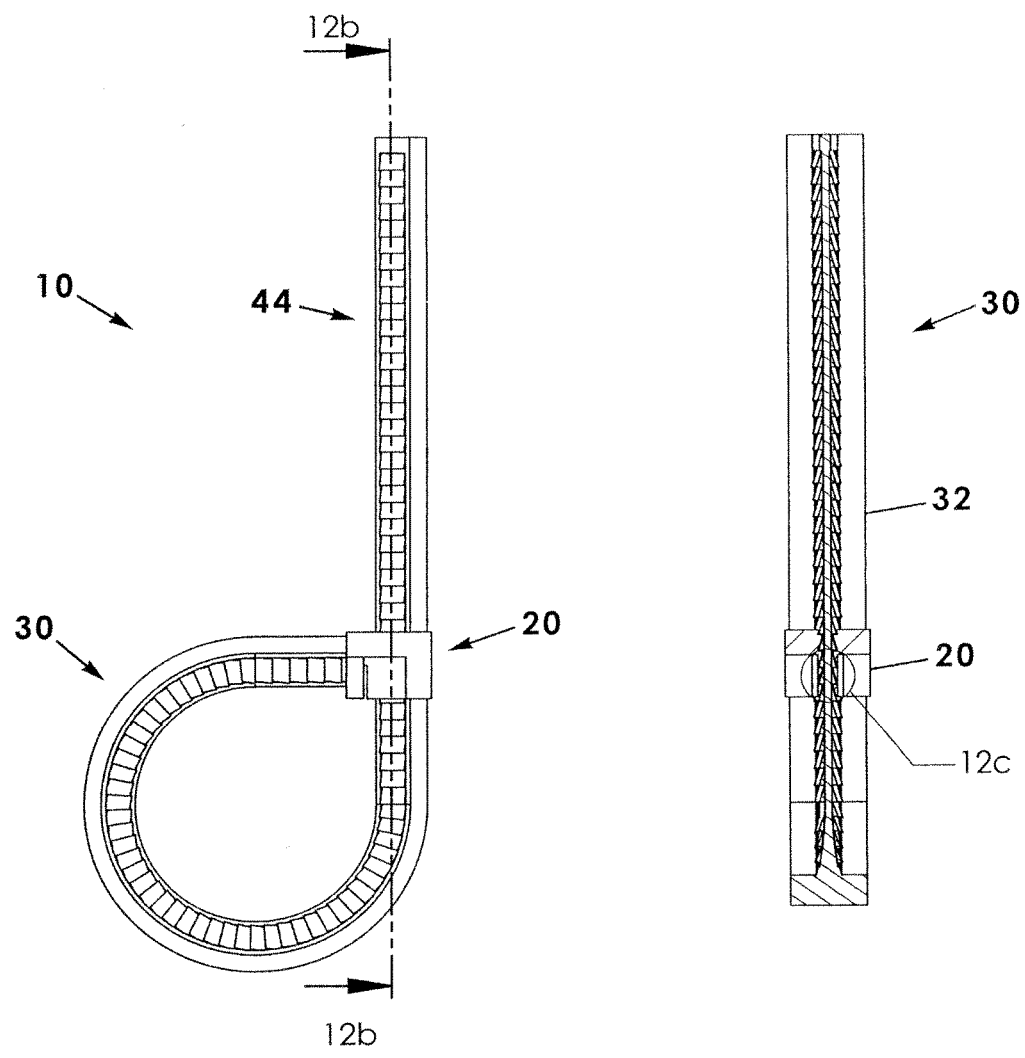
Figure 12C:
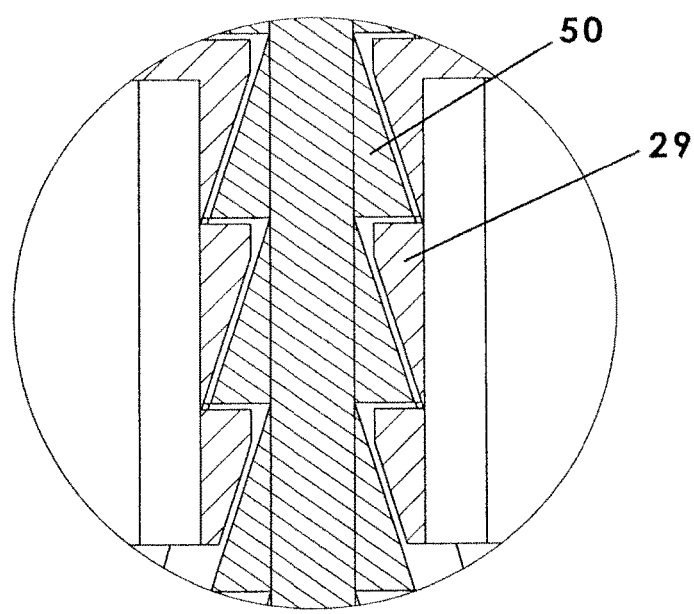
FIG. 12c is an isolated view on an enlarged scale take from FIG. 12b.
Figures 13A, 13B:
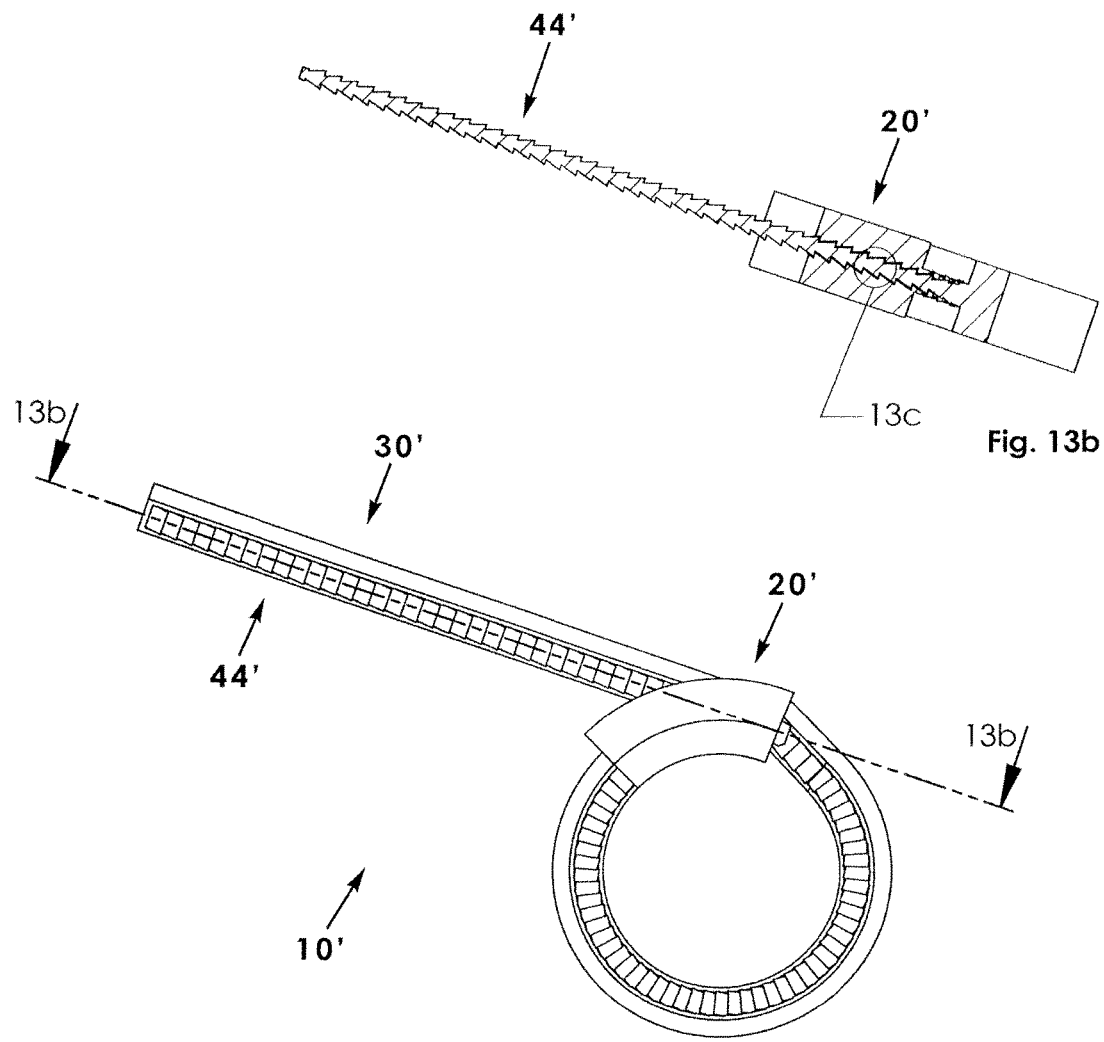
Figure 13C:
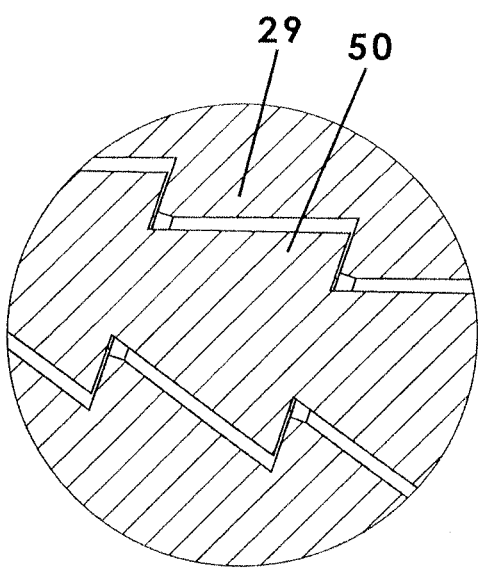
FIG. 13c is an isolated view on an enlarged scale take from FIG. 13b.

Similarly, the V-shaped channel 28 includes a first surface having an inclined or angled surface that includes a plurality of ratchet teeth 29 spaced apart along respective surfaces (FIG. 5). The channel 28 also includes a second surface having an inclined or angled surface that includes a plurality of ratchet teeth 29 (intentionally numbered the same as the aforementioned ratchet teeth). It is understood that the channel 28 is configured to receive or mate with respective ratchet teeth 29 when the tying strap 30 is inserted distal end first through the aperture 26 of the head member 20.

The plurality of ratchet teeth 29 and corresponding teeth 50 of the toothed portion 44 of the tying strap 30 are configured to selectively mate in a ratchet engagement. Specifically, the teeth 50 and the ratchet teeth 29 are positioned in opposite directions and configured as a pawl such that the plurality of teeth 50 of the toothed portion 44 are receivable only in a forward direction relative to the plurality of ratchet teeth 29. In the character of a winch, the tie strap 30 is not removable from the aperture 26 of the head member 20 except by severing or otherwise breaking engaged teeth.

In use, the cable tie device 10 is useful to holding items together. Specifically, the flexible tying strap 30 may be looped around cables, hoses, or wires and then secured together by engaging the tying strap 30 to the head member 20. Specifically, once looped around the objects to be secured, the distal end 40 of the base strip 32 is inserted into the aperture 26 of the head member 20 and respective teeth 50 of the toothed portion 44 are received by respective ratchet teeth 29 in the channel 28 in a one-way ratchet engagement.

Accordingly, the generally triangular configurations of the toothed portion 44 of the tying strap 30 and corresponding triangular channel 28 result in a much enhanced and secure fastening mechanism than any fastener previously proposed or implemented.

Another embodiment of the tying device 10' is shown in FIGS. 2 and 8 to 13c of the accompanying drawings and includes a construction substantially similar to that first described above except as specifically described differently below. Primed numerals are used to refer to the same components as previously designated—even if not specifically repeated below. Specifically, the head member 20' has a configuration that enables the tying strap 30 to be inserted and pulled through at a slightly different angle and to rest more securely upon curved objects being secured.

Figure 2:
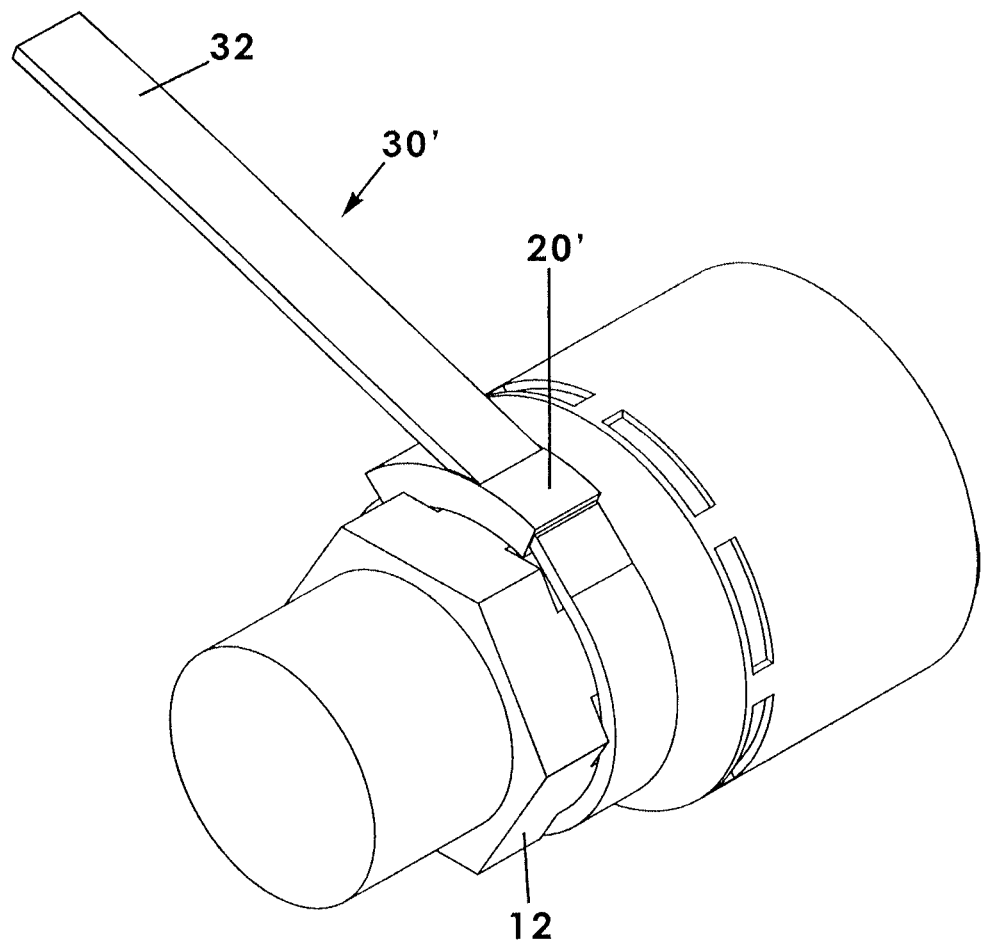
FIG. 2 is a perspective view of a cable tie device according to another embodiment of the present invention illustrated in the engaged configuration.

More particularly, the head member 20' itself may have a more flattened and curved shape configuration defining a hollow interior area. The gently curved configuration of the head member 20' makes it uniquely suited for a bottom wall 27' to rest upon a curved surface of an object being secured, such as a cylindrical hose, hexagonal fastener such as a bolt head or nut (FIG. 2). The head member 20' defines an inlet 21' at an outer end 22' and defines an outlet 23 in a top wall 25' through which the tying strap 30 may be fed through in substantially the same ratcheting relationship described earlier. It can be seen that the outlet 23 is displaced from the outer end 22' such that the tying strap 30 is pulled through at a flatter angle (compared to the angle defined by the aperture 26 and channel 28 of the embodiment first described above).

Other embodiments of a tie device 10" are shown in FIGS. 14 to 17 and include structures having substantially the same construction as those described above except as specifically described below. Structures previously disclosed will be identified in the drawings and the following disclosure using the same reference numerals used above. The tie apparatus 10" according to these embodiments includes a pair of tie devices situated side by side and separated and connected by a bridge member. The bridge member provides support and stability between respective tie devices.

Figure 16:
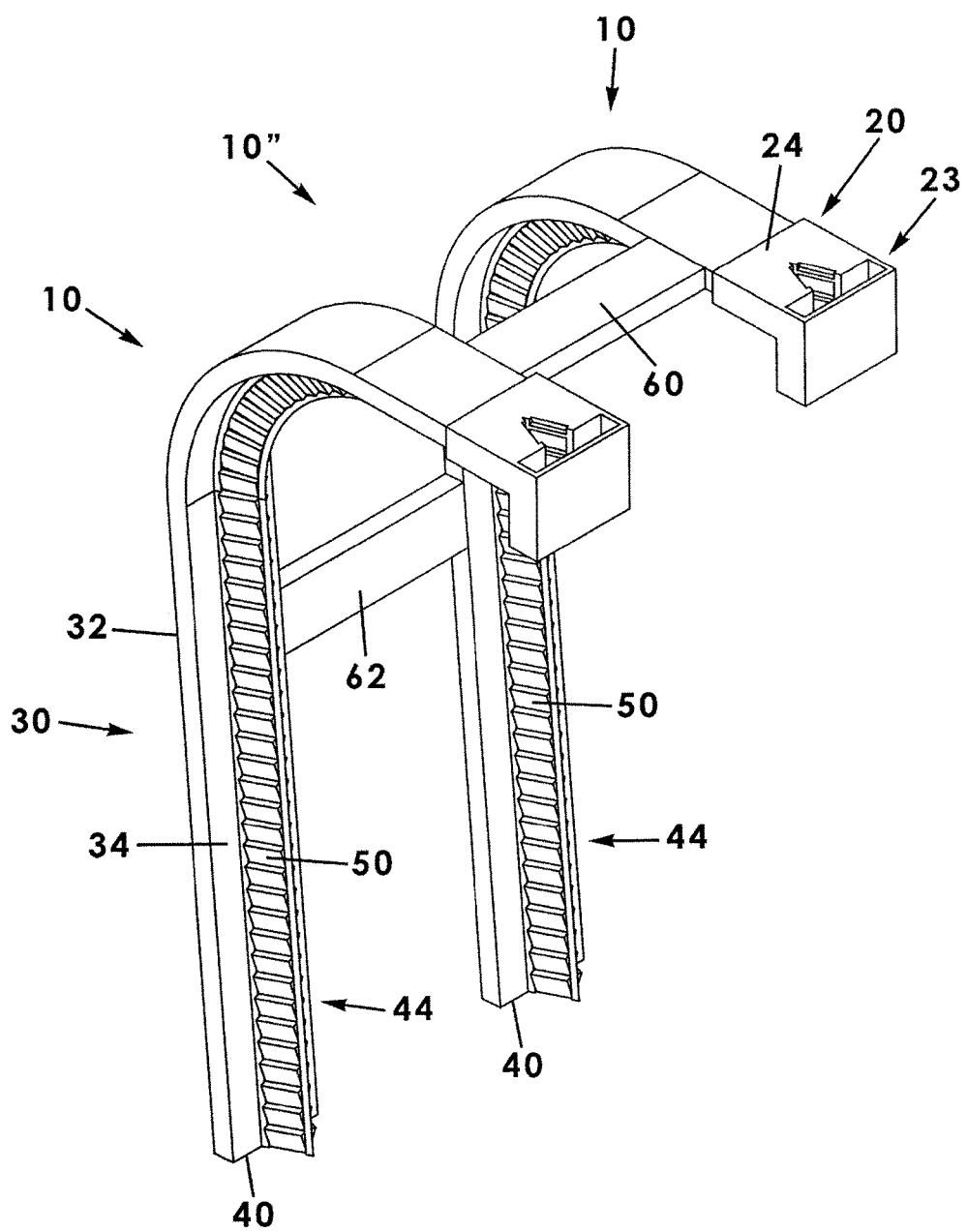
FIG. 16 is a perspective view of a multi-surface cable tie device according to another embodiment of the present invention illustrated in an engaged configuration.
Figure 17:
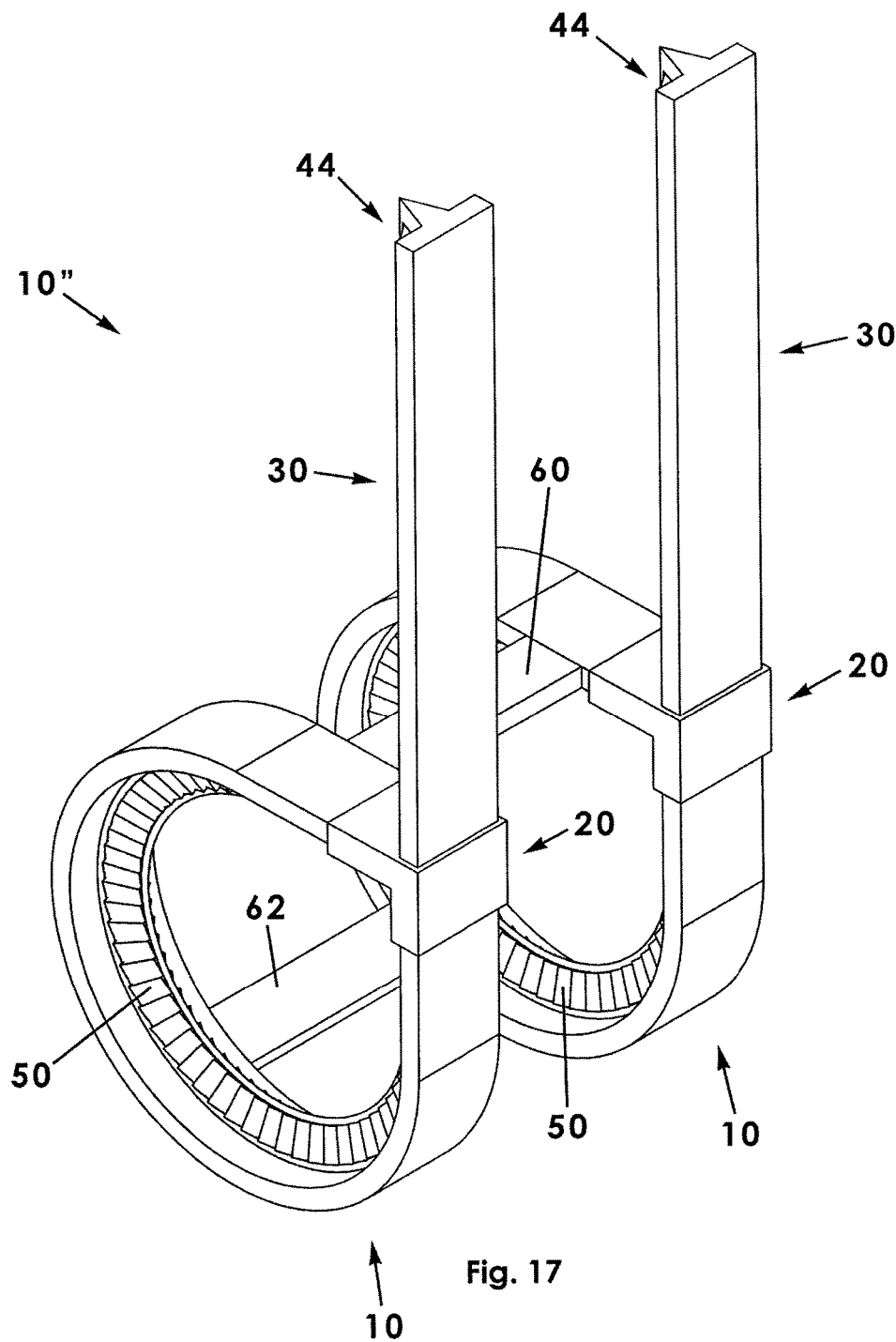
FIG. 17 is a perspective view of the cable tie device as in FIG. 14 illustrated in an engaged configuration.

In a tie apparatus 10", a bridge member may extend between a first respective base strip 32 (or base strip 32') and a second respective base strip 32 (or 32'). It is understood that first and second base strips are identical and are constructed as described above. As shown in FIGS. 16 and 17, a first bridge member 60 extends between respective first ends 38 of respective tying straps 30, the bridge member having opposed ends adjacent corresponding head members 20. Similarly, a second bridge member 62 extends between respective tying straps 30 displaced from respective head members 20 and spaced apart from respective first bridge members 60. Preferably, the first bridge member 60 and the second bridge member 62 have a linear, planar, and rectangular configuration although other configurations may also work.

Figure 14:
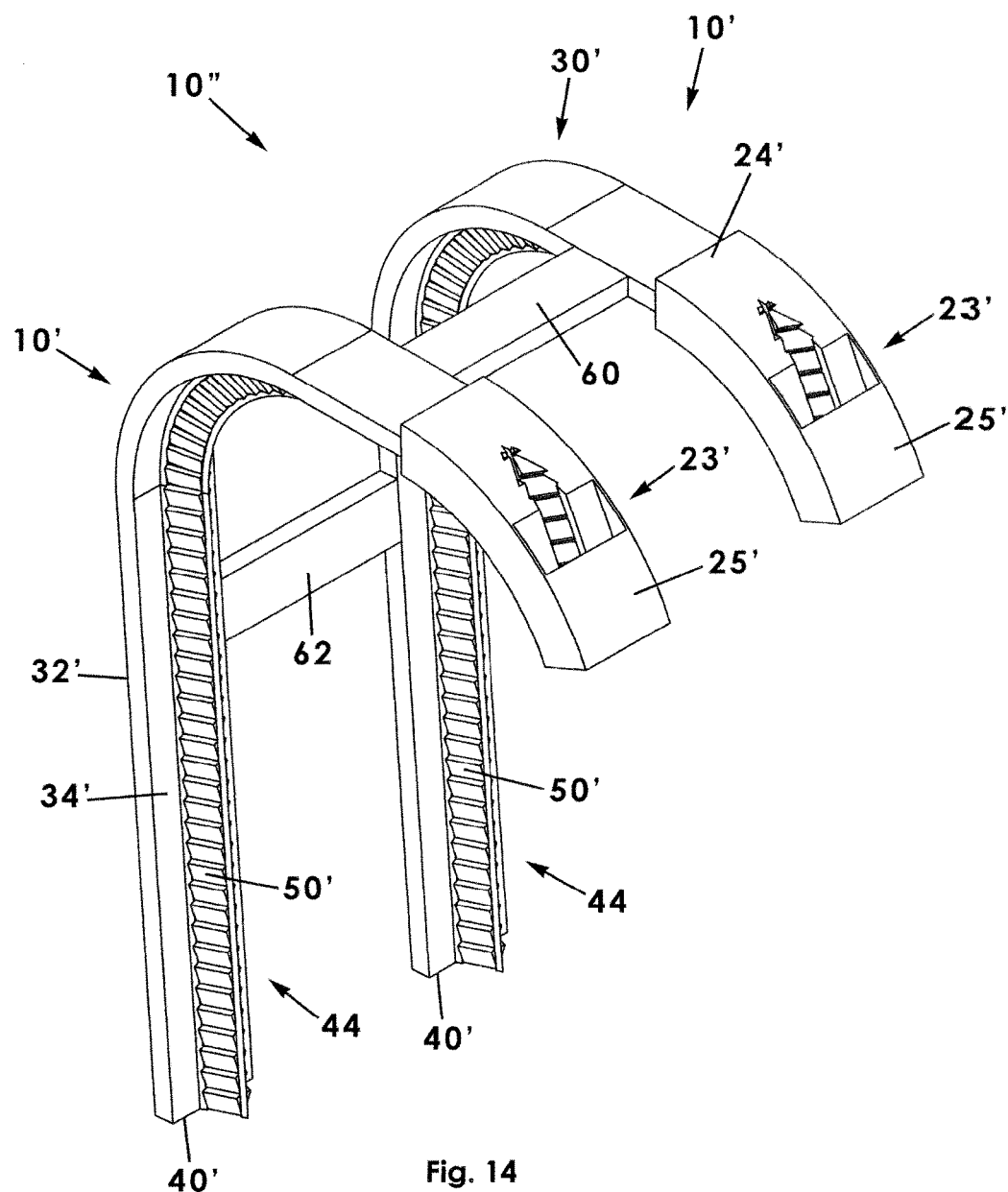
FIG. 14 is a perspective view of a multi-surface cable tie apparatus according to another embodiment of the present invention illustrated in an unengaged configuration.
Figure 15:
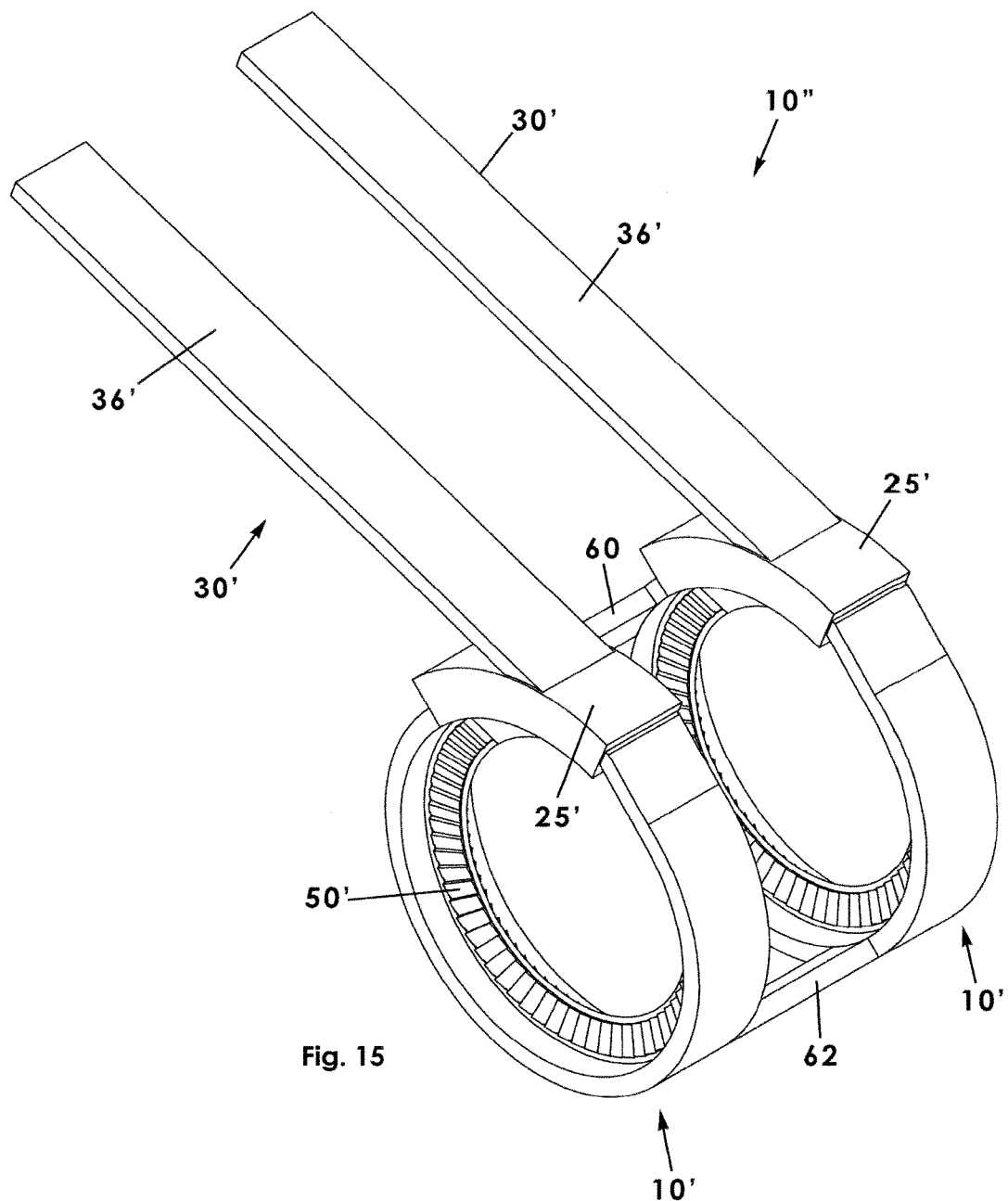
FIG. 15 is a perspective view of the cable tie device as in FIG. 14 illustrated in an engaged configuration.

It is understood that a pair of the cable tying devices 10' described above may also be bridged together in the same manner as just described and this is shown in FIGS. 14 and 15—again using same reference characters as introduced above.

In use, the tie apparatus 10" having a pair of cable tie devices 10 connected by one or more bridge members may be used to securely hold items together—such as cables. The dual tie devices 10 enable two spaced apart portions of the same cable to be secured together by engaging respective tying straps 30 to respective head members 20 in the manner described above. It is understood that spaced apart dual coupling of cables or wires is significantly less likely to become unsecured.

It is understood that while certain forms of this invention have been illustrated and described, it is not limited thereto except insofar as such limitations are included in the following claims and allowable functional equivalents thereof.

The invention claimed is:

1. A multi-surface cable tie apparatus, comprising:
 a pair of spaced apart cable tie devices, each cable tie device including:
  a head member having an outer end and an opposed inner end, said head member defining an aperture;
  an elongate tying strap that includes a base strip having a generally planar configuration that includes a proximal end adjacent said inner end of said head member and a distal end opposite said proximal end, said base strip having an elongate toothed portion mounted to an inside surface of said base strip and that extends between said proximal and distal ends;
  wherein said toothed portion includes a generally V-shaped configuration having a plurality of teeth extending away from said base strip;
  wherein said aperture of said head member defines a generally rectangular configuration for selectively receiving said base strip and a channel defining a generally V-shaped configuration in communication with said aperture for selectively receiving said toothed portion of said tying strap;
 a bridge member extending between respective tying straps of said pair of cable tie devices.

2. The multi-surface cable tie apparatus as in claim 1, wherein:
 said toothed portion of a respective base strip of a respective cable tie device includes a first side wall that is inclined inwardly and a second side wall that is inclined inwardly;
 each side wall includes a lower end adjacent and coupled to an inner surface of said respective base strip, said side walls being spaced apart from one another, respectively;
 said first and second side walls extend away from said inside surface of said respective base strip so as to form an apex displaced from said respective base strip.

3. The multi-surface cable tie device as in claim 2, wherein:
 said channel defined by said head member includes a first surface defining a plurality of ratchet teeth and extending inwardly and a second surface defining a plurality of ratchet teeth, said first and second surfaces extending inwardly to form a nested junction;
 said channel and said plurality of ratchet teeth are configured to selectively mate in a ratchet engagement.

4. The multi-surface cable tie apparatus as in claim 3, wherein said ratchet teeth are configured as a pawl such that said plurality of teeth of said toothed portion are receivable only in a forward direction relative to said plurality of ratchet teeth when said toothed portion of said tying strap is received by said head portion.

5. The multi-surface cable tie apparatus as in claim 1, wherein said base strip of a respective cable tie device includes a pair of side edges that extend between said proximal and distal ends and that are parallel to one another.

6. The multi-surface cable tie apparatus as in claim 1, wherein said tying strap of a respective cable tie device is received distal end first into said aperture and said channel.

7. The multi-surface cable tie apparatus as in claim 4, wherein a respective tying strap of a respective cable tie device is not removable from said head member of a respective cable tie device once received therein.

8. The multi-surface cable tie apparatus as in claim 1, wherein said base strip of a respective cable tie device includes an outside surface having a smooth configuration.

9. The multi-surface cable tie apparatus as in claim 5, wherein said toothed portion is positioned about midway between said side edges of said base strip and the inside surface of said base strip extends laterally on opposed sides of said toothed portion.

10. The multi-surface cable tie apparatus as in claim 1, wherein said toothed portion of said tying strap of a respective cable tie device includes a cross-section having a triangular configuration.

11. A multi-surface cable tie apparatus, comprising:
a first cable tie device and a second cable tie device laterally spaced apart from and parallel to said first cable tie device,
wherein each cable tie device comprises:
a head member having an outer end and an opposed inner end, said head member defining an aperture having rectangular configuration and a channel defining a generally V-shaped configuration in communication with said aperture;
an elongate tying strap that includes a base strip having a planar configuration that includes a proximal end adjacent said inner end of said head member and a distal end opposite said proximal end, said base strip having an elongate toothed portion mounted to an inside surface of said base strip;
wherein said toothed portion includes a generally triangular cross-section and having a plurality of teeth extending away from said base strip;
wherein said aperture is configured to selectively receive said base strip and said channel is configured to receive said toothed portion of said tying strap;
a first bridge member extending between said first and second cable tie devices, said first bridge member having opposed ends adjacent respective head members of respective first and second cable tie devices.

12. The multi-surface cable tie apparatus as in claim 11, wherein:
said toothed portion of a respective base strip includes a first side wall that is inclined inwardly and a second side wall that is inclined inwardly;
each side wall includes a lower end adjacent and coupled to an inner surface of said respective base strip, said side walls being spaced apart from one another, respectively;
said first and second side walls extend away from said inside surface of said respective base strip so as to form an apex.

13. The multi-surface cable tie device as in claim 12, wherein:
said channel defined by a respective head member includes a first surface defining a plurality of ratchet teeth and extending inwardly and a second surface defining a plurality of ratchet teeth, said first and second surfaces extending inwardly to form a nested junction;
said channel and said plurality of ratchet teeth are configured to selectively mate in a ratchet engagement.

14. The multi-surface cable tie apparatus as in claim 13, wherein said ratchet teeth are configured as a pawl such that said plurality of teeth of said toothed portion are receivable only in a forward direction relative to said plurality of ratchet teeth when said toothed portion of said tying strap is received by said head portion.

15. The multi-surface cable tie apparatus as in claim 11, wherein said base strip of a respective cable tie device includes a pair of side edges that extend between said proximal and distal ends and that are parallel to one another.

16. The multi-surface cable tie apparatus as in claim 11, wherein said tying strap of a respective cable tie device is received distal end first into said aperture and said channel.

17. The multi-surface cable tie apparatus as in claim 14, wherein said tying strap of a respective cable tie device is not removable from said head member once received therein.

18. The multi-surface cable tie apparatus as in claim 11, wherein said head member of a respective cable tie device includes a curved configuration capable of resting atop a curved object.

19. The multi-surface cable tie apparatus as in claim 15, wherein said toothed portion is positioned about midway between said side edges of said base strip and the inside surface of said base strip extends laterally on opposed sides of said toothed portion.

20. The multi-surface cable tie apparatus as in claim 11, wherein said toothed portion of said tying strap of a respective cable tie device includes a cross-section having a triangular configuration.

\* \* \* \* \*